US009800401B2

(12) United States Patent
Knop et al.

(10) Patent No.: US 9,800,401 B2
(45) Date of Patent: Oct. 24, 2017

(54) INITIALIZATION VECTORS GENERATION FROM ENCRYPTION/DECRYPTION

(71) Applicant: International Business Machines Corporation, Armonk, NY (US)

(72) Inventors: Felipe Knop, Poughkeepsie, NY (US); Anil Kurmus, Rueschlikon (CH); Alessandro Sorniotti, Rueschlikon (CH); Yuri Volobuev, San Ramon, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/677,109

(22) Filed: Apr. 2, 2015

(65) Prior Publication Data

US 2015/0312030 A1  Oct. 29, 2015

(30) Foreign Application Priority Data

Apr. 23, 2014  (EP) ..................................... 14165671

(51) Int. Cl.
*H04L 9/00* (2006.01)
*G06F 21/72* (2013.01)
*H04L 9/06* (2006.01)
*G06F 21/62* (2013.01)

(52) U.S. Cl.
CPC .............. *H04L 9/008* (2013.01); *G06F 21/62* (2013.01); *G06F 21/72* (2013.01); *H04L 9/0637* (2013.01); *H04L 2209/24* (2013.01)

(58) Field of Classification Search
None
See application file for complete search history.

(56) References Cited

U.S. PATENT DOCUMENTS

| 7,472,285 B2* | 12/2008 | Graunke ............ G06F 12/1408 |
| | | 380/262 |
| 8,355,499 B2* | 1/2013 | Asnaashari ............... H04L 9/28 |
| | | 380/28 |
| 8,379,841 B2 | 2/2013 | Taylor et al. |
| 8,472,623 B2 | 6/2013 | Fukushima et al. |
| 8,634,549 B2 | 1/2014 | Schneider |
| 2005/0094805 A1* | 5/2005 | Kitani ................... H04L 9/0662 |
| | | 380/28 |
| 2006/0031873 A1* | 2/2006 | Fahrny ................... H04N 7/162 |
| | | 725/31 |

(Continued)

OTHER PUBLICATIONS

Felipe Knop, et al.,"Initialization Vectors Generation From Encryption/Decryption," U.S. Appl. No. 14/748,581, filed Jun. 24, 2015.

(Continued)

*Primary Examiner* — Christopher Revak
(74) *Attorney, Agent, or Firm* — Cantor Colburn LLP; Jeffrey LaBaw

(57) ABSTRACT

A computer-implemented method of encryption of several units of a computerized system, wherein each of the units comprises data, includes generating distinct initialization vectors, or IVs, for the units, and storing the generated IVs; and for each unit of the several units: accessing a stored IV corresponding to the unit; and encrypting the unit according to the accessed IV and an encryption key.

11 Claims, 5 Drawing Sheets

(56) References Cited

U.S. PATENT DOCUMENTS

| | | | | |
|---|---|---|---|---|
| 2006/0153375 | A1* | 7/2006 | Yi | H04L 63/0428 380/44 |
| 2008/0013715 | A1* | 1/2008 | Feghali | G06F 7/52 380/28 |
| 2009/0034715 | A1* | 2/2009 | Ramasamy | H04L 9/0637 380/28 |
| 2009/0161874 | A1* | 6/2009 | Eun | H04L 12/2856 380/277 |
| 2010/0142710 | A1* | 6/2010 | Chrysler | H04L 9/0894 380/277 |
| 2011/0047377 | A1* | 2/2011 | Allen | H04L 9/0866 713/168 |
| 2012/0106738 | A1* | 5/2012 | Belenkiy | H04L 9/0872 380/270 |
| 2013/0077780 | A1 | 3/2013 | Rogaway | |
| 2013/0136256 | A1* | 5/2013 | Relyea | H04L 9/0637 380/28 |
| 2013/0318630 | A1* | 11/2013 | Lam | G06F 21/60 726/28 |
| 2014/0355754 | A1* | 12/2014 | Leung | H04L 9/28 380/28 |
| 2014/0373131 | A1* | 12/2014 | Kudelski | G06F 21/34 726/18 |
| 2015/0086015 | A1* | 3/2015 | Falk | H04L 9/08 380/255 |
| 2015/0318984 | A1* | 11/2015 | Knop | G06F 21/72 380/28 |

OTHER PUBLICATIONS

List of IBM Patents or Patent Applciations Treated as Related; CH920140016US1, Date Filed: Apr. 2, 2015, pp. 1-2.

M.A. Halcrow, "eCryptfs: An Enterprise-class Cryptographic Filesystem for Linux," In Proceedings of the Linux Symposium, Ottawa, ON, Canada, Jul. 2005, pp. 1-18.

Morris Dworkin, "Recommendation for Block Cipher Modes of Operation, Methods and Techniques," Computer Security, National Institute of Standards and Technology, NIST Special Publication 800-38A, Dec. 2001, pp. 1-66.

S. Park, et al., "Design and Implementation of the Communication Protocol for Efficient CBC mode Processing in IPSec," IEEE Region 10 Conference TENCON, Nov. 14-17, 2006, pp. 1-4.

* cited by examiner

INITIALIZATION VECTORS GENERATION FROM ENCRYPTION/DECRYPTION

FOREIGN PRIORITY

This application claims priority to European Patent Application No. 14165671.0, filed Apr. 23, 2014, and all the benefits accruing therefrom under 35 U.S.C. §119, the contents of which in its entirety are herein incorporated by reference.

BACKGROUND

The invention relates in general to the field of encryption and decryption. In particular, it is directed to encryption/decryption methods using initialization vectors or values that are generated for every storage block.

The General Parallel File System (GPFS) will include native encryption support starting from GPFS 4.1. One of the supported encryption modes is CBC-IV. When encrypting a file using the CBC-IV mode, unique initialization values (IVs) are generated for every "storage block" that is encrypted (512 bytes in the case of GPFS, though this size can vary) to ensure randomized encryption. Because storing this IV would be prohibitively expensive on a filesystem (there is no extra space in a disk sector), the IVs have to be generated on the fly. Many, if not all related encrypting file systems adopt that same approach, see for instance M Halcrow, eCryptfs: an enterprise class encrypting file system.

SUMMARY

A computer-implemented method of encryption of several units of a computerized system, wherein each of the units comprises data, includes generating distinct initialization vectors, or IVs, for the units, and storing the generated IVs; and for each unit of the several units: accessing a stored IV corresponding to the unit; and encrypting the unit according to the accessed IV and an encryption key.

DETAILED DESCRIPTION

Figure 1:
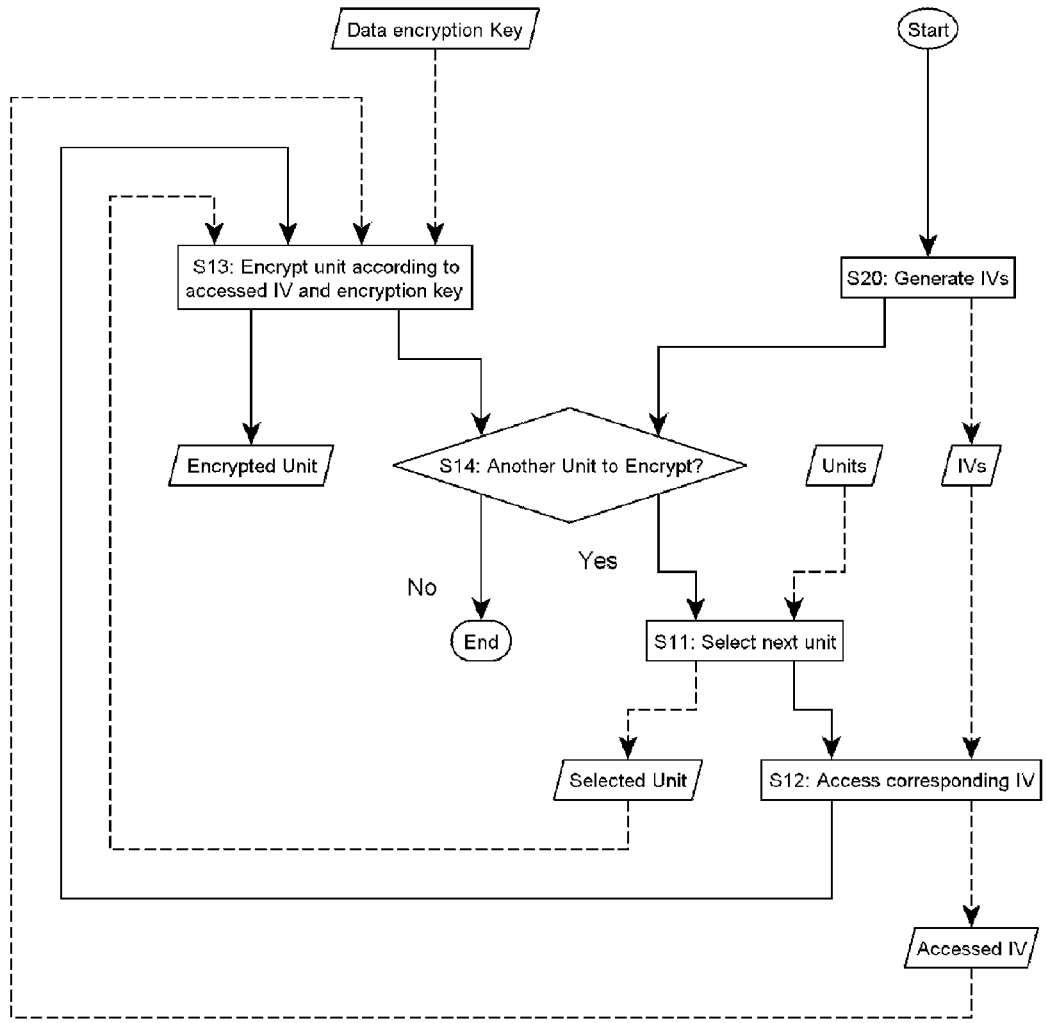
FIG. 1 is a flowchart illustrating high-level operations of a method of encryption, according to embodiments of the invention.

According to a first aspect, the present invention is embodied as a computer-implemented method of encryption of several units of a computerized system, wherein each of the units comprises data, the method comprising: generating distinct initialization vectors, or IVs, for the units, and storing the generated IVs; and for each unit of the several units: accessing a stored IV corresponding to the unit; and encrypting the unit according to the accessed IV and an encryption key.

In embodiments, storing the generated IVs comprises storing the generated IVs on an IV cache memory, and accessing, for each unit of the several units, a stored IV, comprises accessing the stored IV from the IV cache memory.

Generating the distinct IVs for the units comprises generating an IV for each of the units, respectively.

In embodiments, generating the distinct IVs comprises checking, for each of the units and prior to generating an IV for each of the units, whether an IV is already available for the each of the units; and if it is determined that an IV is already available for a given unit, skipping the generation of a corresponding IV.

Preferably, the method further comprises, prior to generating the IVs: instantiating an IV-generating cipher, and generating the distinct IVs is carried out using the instantiated IV-generating cipher.

In embodiments, each of the IVs is generated based on a tweak that comprises a unit identifier, and accessing a stored IV corresponding to a given unit is performed based on that same tweak.

According to another aspect, the invention is embodied as a computer-implemented method of decryption of several units, which have been encrypted according to a method according to any one of the above embodiments, the decryption method comprising, for each unit of the several units to be decrypted: accessing a stored IV corresponding to the unit; decrypting the unit according to the accessed IV and an encryption key that was used for encrypting the unit.

In exemplary embodiments, the method further comprises, prior to accessing any of the stored IVs: re-generating at least some of the IVs for the units and storing the re-generated IVs.

At least some of the IVs are already stored on an IV cache memory and the at least some of the IVs are accessed from the IV cache memory for subsequently decrypting the corresponding units.

In embodiments, each of the IVs is generated, prior to storing it, by means of electronic codebook encryption.

Each of the IVs is generated, prior to storing it, combining a unit offset, indicating an offset of a corresponding unit, and a randomly generated value. Encrypting or decrypting a unit uses an xor-encrypt-xor (XEX), or XEX-based tweaked-codebook mode with ciphertext stealing (XTS) encryption mode with a block cipher.

According to still another aspect, the invention is embodied as a computerized system configured for encrypting several units, wherein each of the units comprises data, the system comprising: an initialization vectors generating component for generating initialization vectors, or IVs, for the units, a memory, coupled to the initialization vectors generating component, for storing the generated IVs; an encryption and/or decryption component coupled to the memory to access, for each unit of the several units, a stored IV corresponding to the unit and encrypt or decrypt the unit according to the accessed IV and an encryption key. The memory is preferably a cache memory.

According to a final aspect, the invention is embodied as a computer program product for encrypting and/or decrypting several units of a computerized system, the computer program product comprising a computer-readable storage medium having computer-readable program code embodied therewith, the computer-readable program code configured to implement the method according to any one of the embodiments above.

Systems and methods embodying the present invention will now be described, by way of non-limiting examples, and in reference to the accompanying drawings.

A core idea of this invention is to decouple the IV generation phase from the encryption or the decryption phase, whereas the IV generation phase is, in the prior systems, always tightly coupled with the encryption/decryption of each single data unit (e.g., blocks), see e.g., NIST Special Publication 800-38A. Recommendation for Block Cipher Modes of Operation. Methods and Techniques.

In reference to FIG. 1, an aspect of the invention is first described, which concerns a computer-implemented method of encryption of data units of a computerized system. Most basically, this method revolves around two main operations. During a first operation, distinct initialization vectors (also sometimes referred to as "initialization vectors" and hereafter denoted by "IVs") are generated, operation S20 (see also operation S26 in FIG. 2), for the units. The generated IVs can then be stored, operation S27. During a second main operation, a loop is performed over each unit. Namely, for each unit: a stored IV that corresponds to the unit is accessed, operation S12, and the unit is encrypted S13 according to: (i) the corresponding IV accessed, and (ii) an encryption key.

The IV generation phase is accordingly decoupled from the encryption phase, contrary to the usual approaches. Present inventors have realized that the former approaches were time consuming and suboptimal and that the IV generation could in fact be decoupled from the encryption (or decryption) phase, that is, the IV generation could be performed outside the unit encryption loop.

For instance, and as discussed below in more detail: when a cipher-based derivation of IVs is contemplated, the schemes proposed herein lead to substantial performance gains (typically 5 to 20%, or more, depending on hardware and workloads). For instance, embodiments of the present invention break the classic pattern of (i) instantiate cipher; (ii) derive IVs; (iii) encrypt units, and instead propose a novel pattern which allows the processing of several units to be merged altogether.

This new approach is motivated by realizing that most calls to encryption in a filesystem may be for large units of data (e.g., a filesystem block size, which would for instance be 256 KB in GPFS by default). Such embodiments happen to save CPU-time at the price of a small increase in memory consumption. Embodiments proposed herein may accordingly involve:
(i) A one-time instantiation of an IV-generating cipher;
(ii) A bulk derivation of all IVs of interest, i.e., IVs needed for all encryption units, which are then stored into an IV memory cache; and
(iii) For each unit:
a. Perform a fast lookup of the corresponding IV from the IV cache;
b. Instantiate the cipher; and
c. Encrypt this unit.

This results in significantly improved throughput and latency, and incidentally less CPU consumption and therefore less power consumption.

Note that a "unit" as used herein can be a file, a disk sector, a memory page, a buffer, or more generally any suitable data grain. Embodiments of the invention can be applied notably to GPFS systems, i.e., data units are typically units of a filesystem.

The unit encryption mode can be, for example, the so-called CBC-IV (for cipher block chaining with an IV), XTS (extended tweakable cipher), or any mode making use of either tweaks and/or IVs. If an encryption mode such as XTS is used, which directly uses a tweak and internally generates IVs, the present methods can still be applied internally (i.e., directly within the software or hardware that implements the encryption functionality) to the encryption mode.

Encrypting or decrypting a unit uses the XEX encryption mode (i.e., xor-encrypt-xor) or the XTS encryption mode (i.e., XEX-based tweaked-codebook mode with ciphertext stealing), with a block cipher. Any suitable block cipher can be contemplated e.g., AES (advanced encryption standard), DES (data encryption standard), Triple DES, etc. In XTS mode, a unit identifier (e.g., a sector offset) is also encrypted using the block cipher, prior to being Galois-field-multiplied with an offset and xor'ed to a plaintext or ciphertext. Applying the present methods may, in that respect, result in optimizing the encryption of the unit offset by grouping many such encryption operations.

Figure 2:
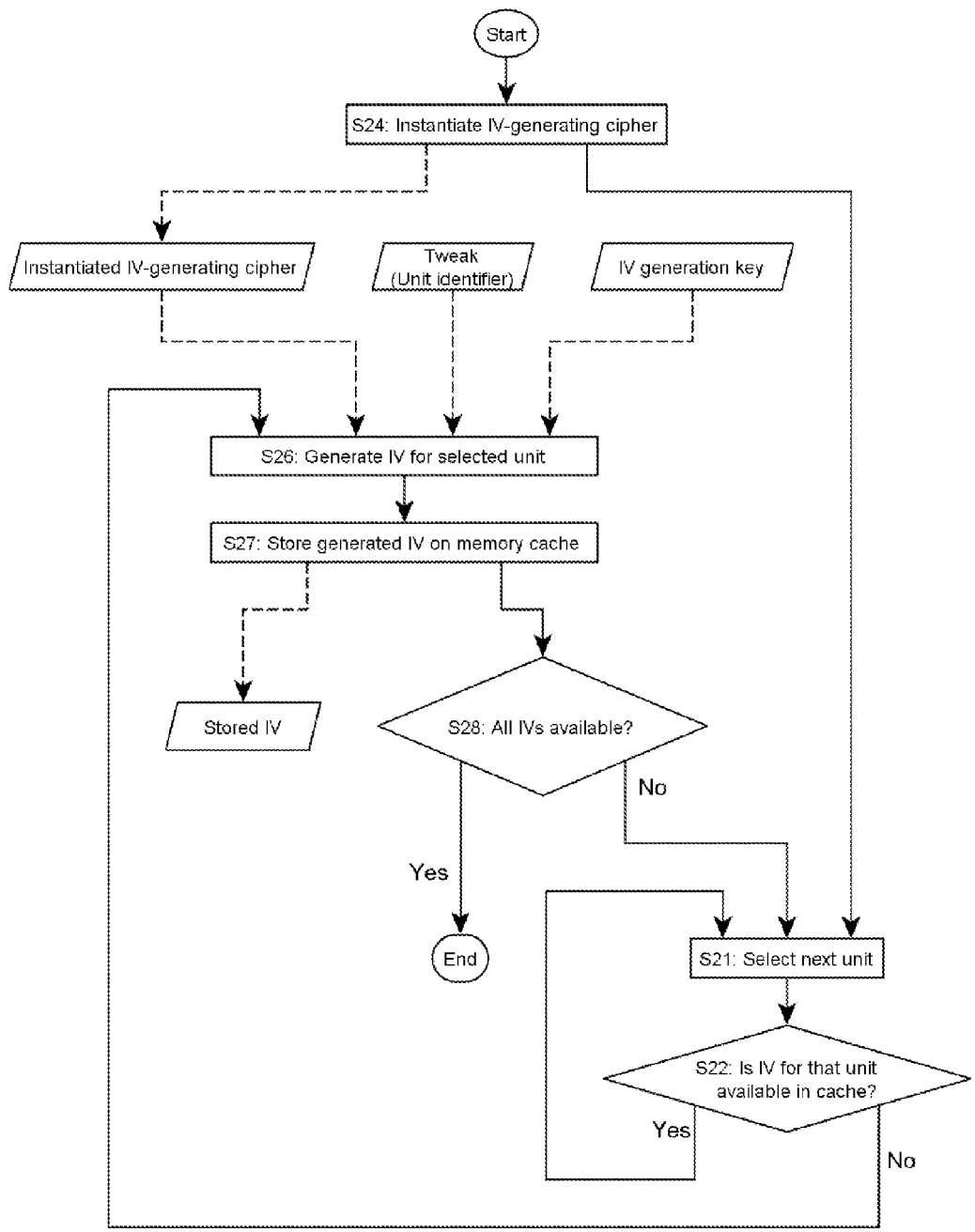
FIG. 2 is a flowchart illustrating high-level operations of a method for generating initialization vectors, as involved in embodiments.

Referring now to FIG. 2: as evoked above, the generated IVs are stored S27 on a cache memory, to allow for quick look-up of IVs. Consistently, IVs are subsequently accessed S12 from the IV cache memory, when needed for encrypting/decrypting the units. Using a cache, e.g., a memory tightly coupled to processor(s) executing instructions in accordance with operations discussed herein, makes sense inasmuch as the IVs are generated beforehand (otherwise it would not). This greatly accelerates the encryption/decryption processes.

In embodiments, distinct IVs are generated S26 for each of the units. A 1-to-1 mapping of IVs to data units is preferred, for security reasons. Otherwise, it would be possible that a same ciphertext results for two identical data units. As a result of using distinct IVs, two units having same contents result in different cipher texts.

As further illustrated in FIG. 2, the IV generation operation S26 preferably comprises checking (operation S22), for each unit (and prior to generating an IV for this unit), whether an IV is already available for that unit. A relevant IV may already have been generated and stored, e.g., in cache, owing to the preferred approaches discussed herein. If it is determined that an IV is already available, then the generation of this IV is skipped, and the process may then select a next unit, operation S21.

As evoked earlier, embodiments of the present methods may further comprise, prior to generating the IVs, instantiating S24 an IV-generating cipher, as reflected in FIG. 2. The subsequent generation of the IVs may accordingly be carried out using the instantiated IV-generating cipher.

In variants, an IV-generating cipher (also called IV-deriving cipher) can be instantiated for each unit, instead of being instantiated beforehand. Note that a distinction should be made between: (i) the IV-generating cipher and (ii) a data encrypting cipher (the latter being also involved, in embodiments), as discussed below. Using an IV-generating cipher is advantageous, compared to a hash function, as it allows for optimally generating all the necessary IVs beforehand, while requiring only one instantiation of the cipher. Using a hash function or a similar function would instead require to re-instantiate the hash function for each IV to be generated.

Embodiments that involve an a priori instantiation of an IV-generating cipher (as in FIG. 2), differ from solutions as proposed in e.g., US20130136256A1, where use is made of an IV to generate another IV. Yet, not all the necessary IVs are stored before the encryption loop, i.e., outside the loop and prior to the encryption loop. In this solution, the use of hashing anyway prevents the generation of all the necessary IVs beforehand in one shot. Furthermore, this solution does not make explicit the mapping between the final IVs and the blocks.

Now, and beside the IV-generating cipher, present methods may further comprise instantiating a data-encrypting cipher, e.g., a data encryption key (as assumed in FIG. 1), before the encryption loop. A data encryption key may be, for example, a key or a key schedule associated with an encrypting function. Different keys are typically used for the IV-generating cipher and the data encrypting cipher.

As further seen in FIG. 2, a tweak may advantageously be used as input to generate IVs, operation S26. Correspondingly, a stored IV can be accessed (operation S12 in FIG. 1) using that same tweak (though the use of this tweak is not explicitly shown in FIG. 1). Preferably, this tweak is, comprises or is based on a unit identifier, e.g., a number combining a unit offset and a randomly generated value. The advantage is that this identifier is typically already available when encrypting/decrypting and therefore there is no need to create distinct unique values. In variants, the unit identifier may comprise or consist of a unit offset or a sequence number, or still any unique random value mapped onto a given unit, or still the combination of a unit identifier and any random value, or more generally, any value that suitably be used to identify a unit.

Figure 3:
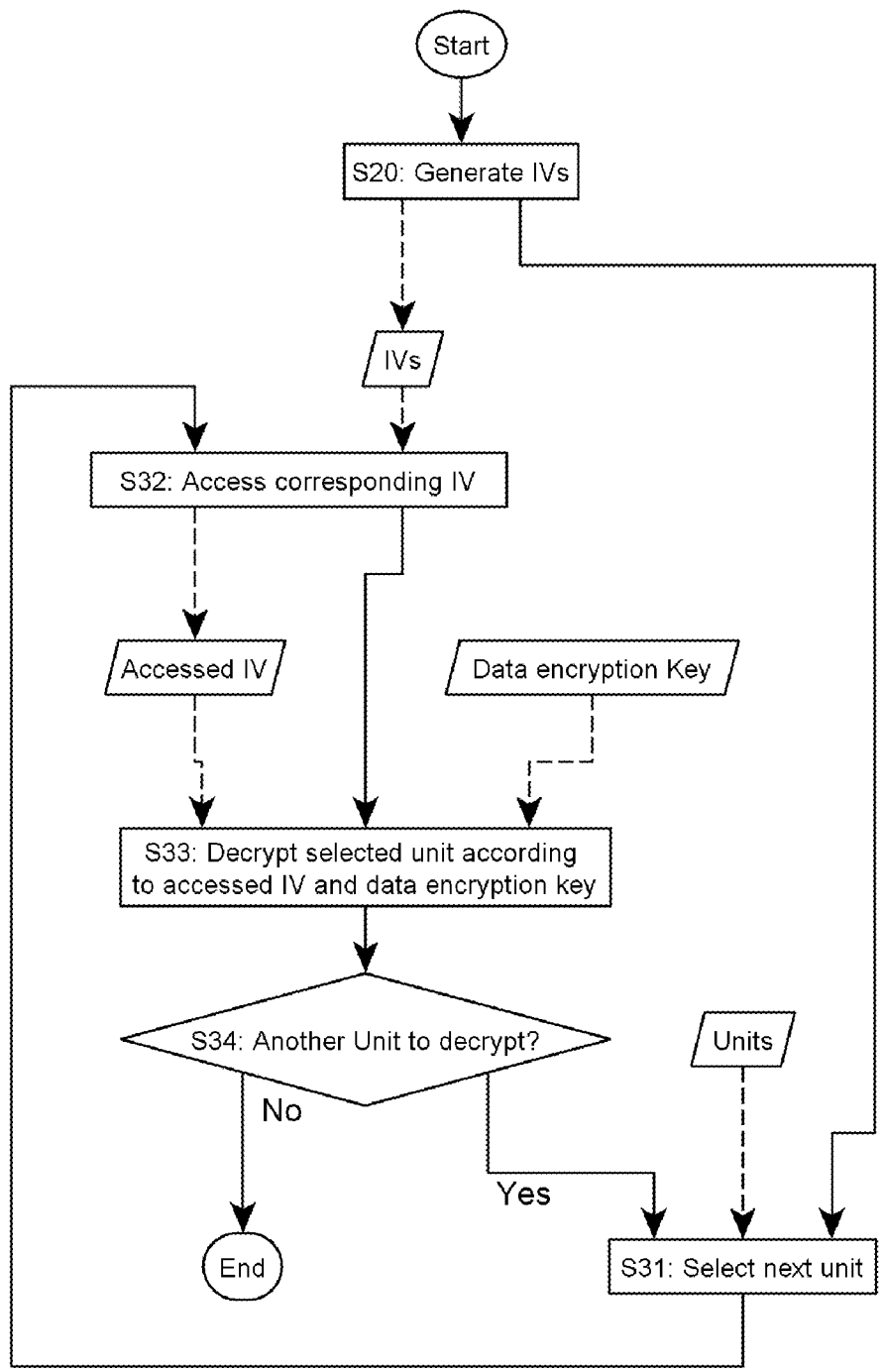
FIG. 3 is a flowchart illustrating high-level operations of a method of decryption, according to embodiments.

Referring now to FIG. 3, and according to another aspect, the invention can be embodied as a method of decryption of data units, i.e., that have been encrypted according to the above methods. Consistently with the above encryption methods, this decryption method most generally comprises two main operations:

(i) For each unit to be decrypted: a stored IV that corresponds to this unit is accessed S32; and (ii) This unit is decrypted S33 according to the accessed IV (as well as a data encryption key that was used for encrypting the unit).

For the same reasons as discussed above, IVs are preferably stored on an IV cache. Thus, at least some of the IVs are already stored on an IV cache memory and these can be accessed S32 from cache for subsequently decrypting S33 the corresponding units.

Notwithstanding the above considerations, present inventors have realized that in may be advantageous, in some cases, to re-generate at least some of the IVs (and accordingly store the re-generated IVs). IV regeneration may indeed be advantageous in those cases where it turns out to be more efficient to re-generate some of the IVs rather than finding out which IVs should be generated. For instance, an IV may have been generated for unit identifier number 1001 and 1003 in the past, but it is now necessary to generate IVs for unit identifiers 1000, 1001, 1002, 1003 and 1004. In some implementations and hardware, it may be faster to generate IVs for all such units (therefore, also regenerating IVs for units 1001 and 1003), instead of individually generating IVs 1000, 1002 and 1004.

The IVs are preferably generated by means of electronic codebook encryption (or ECB encryption). Especially in that case and as noted above, an IV is preferably generated S26 by combining a unit offset, i.e., indicating an offset of the corresponding unit, and a randomly generated value. A randomly generated value may be unique to a group of units only (e.g., all units within a file), while the unit offsets guarantee that each generated IV is unique.

Figure 4:
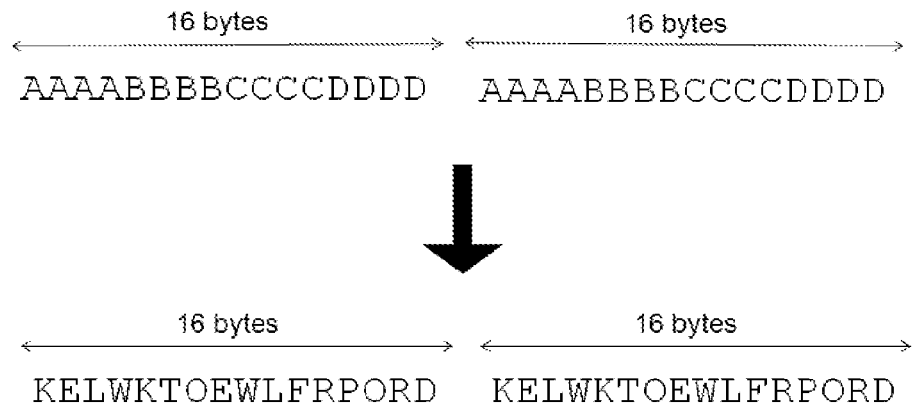
FIG. 4 illustrates an electronic codebook encryption process applied to two data blocks.

An example of ECB encryption of two blocks (using a 16-byte-block cipher such as AES) is given in FIG. 4. When encrypting two 16-byte blocks of same content (both "AAAABBBBCCCCDDDD"), one ECB encryption pass will result in two 16-byte blocks with identical content ("KELWKTOEWLFRPORD").

Figure 5:
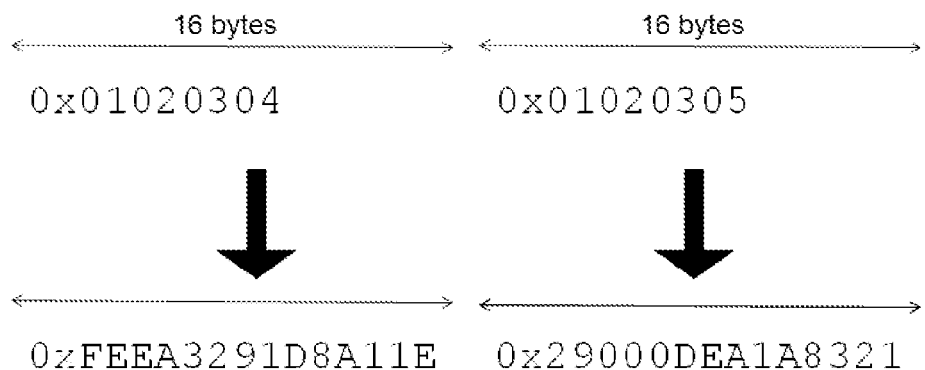
FIG. 5 illustrates a basic initialization vectors generation process for two data blocks.

In contrast, one can individually encrypt each block by directly making use of the underlying block cipher, as seen in FIG. 5. This results in two individual calls to the encryption function, which may duplicate some one-time costs (such as creating a key schedule for AES).

In variants to ECB encryption, any pseudo-random function (PRF) could be used to generate the IVs (such functions require an additional key). This can for instance be a symmetric cipher such as AES, using methods such as Cipher block chaining (CBC) or encrypted salt-sector initialization vector (ESSIV). Furthermore, a unique random value could be used as an IV directly.

FIG. 5 illustrates a basic initialization vectors generation process for two units: one with unit identifier 0x01020304, and the other with unit identifier 0x01020305. By making two individual calls to the underlying block cipher encryption function, one may duplicate initialization costs for this block cipher. In addition, by performing the IV generation, followed by encryption of the data, and followed once again by and IV generation phase and followed again by encryption of the data, can have detrimental effects on the instruction cache of the CPU (central processing unit).

Figure 6:
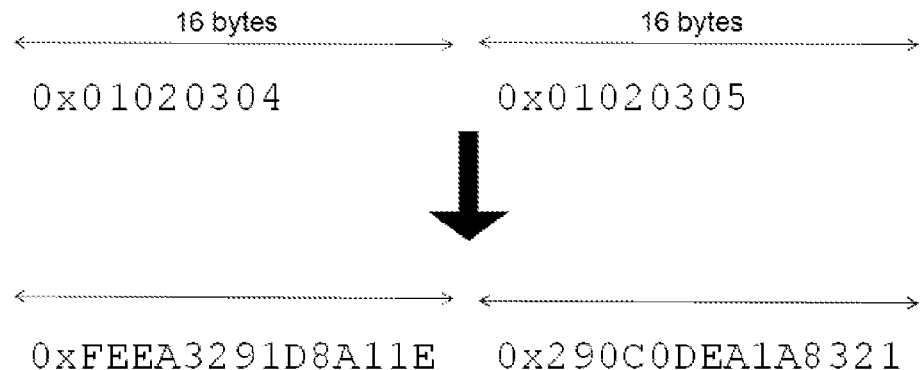
FIG. 6 illustrates an optimized initialization vectors generation of two data blocks, as involved in embodiments of the invention.

FIG. 6 illustrates an optimized initialization vectors generation of two data blocks, as involved in embodiments. Namely, by using ECB mode directly, one can generate IVs for both units "simultaneously", resulting in performance improvements.

Figure 7:
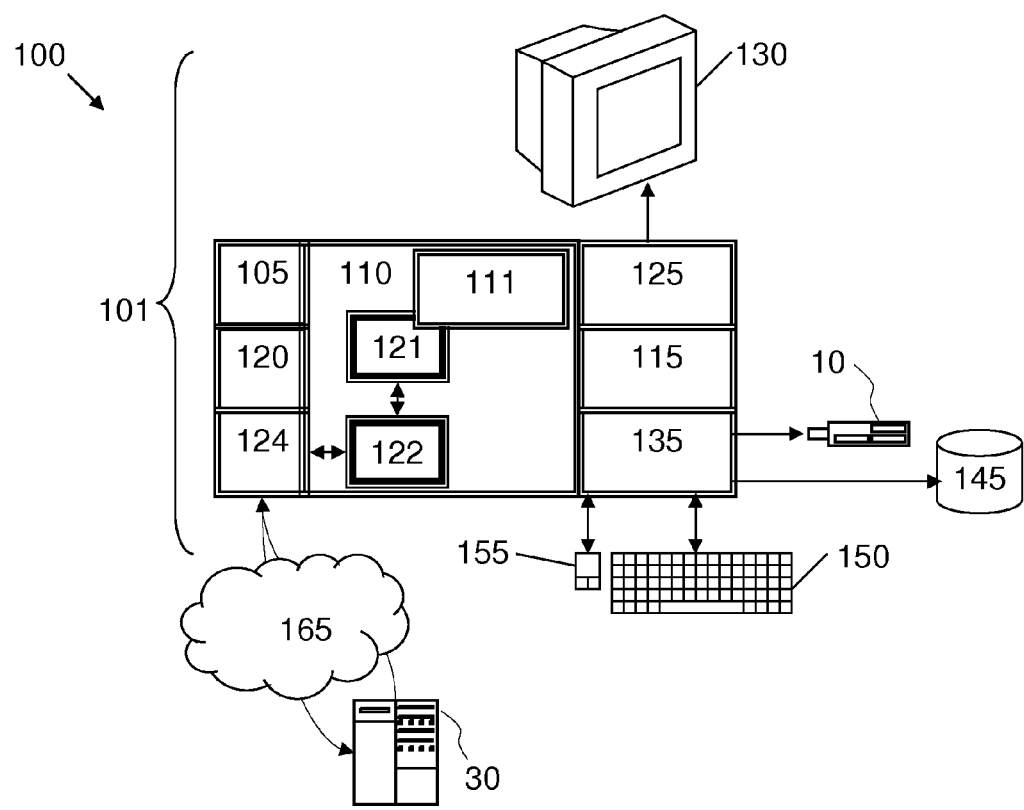
FIG. 7 schematically represents a general purpose computerized system, suited for implementing methods according to embodiments.

Next, and according to a further aspect, the invention can be embodied as a computerized system configured for encrypting/decrypting data units, i.e., a system allowing present methods to be implemented. Such a system comprises essentially three components: (i) an IV generating component for generating IVs, for the units, (ii) a memory, coupled to the IV generating component, storing IVs generated for the units; and (iii) an encryption and/or decryption component coupled to the memory to access, for each unit to be encrypted/decrypted, a stored IV corresponding to the unit and encrypt or decrypting the unit according to the accessed IV and an encryption key. (The mapping is preferably 1-to-1: a requirement for secure encryption is to not reuse IVs). In embodiments, and as touched earlier, the memory is a cache memory. An exemplary system 100 is described in detail in the next section, in reference to FIG. 7.

Finally, and according to still another aspect, the invention can be embodied as a computer program product for encrypting and/or decrypting several data units, comprising a computer-readable storage medium having computer-readable program code embodied therewith, where this computer-readable program code is configured to implement operations as described above, and notably in reference to FIGS. 1-3. Suitable code may notably include the IV generating component and the encryption and/or decryption component discussed above. Such computer program product can be used on a computerized system such as described above.

The above embodiments have been succinctly described in reference to the accompanying drawings and may accommodate a number of variants. Several combinations of the above features may be contemplated. Examples are given below:

For instance, embodiments may involve the following combination of operations (for encryption): (i) a one-time instantiation of an IV-generating cipher (as assumed in FIG. 2); (ii) a bulk derivation of all IVs of interest, i.e., IVs needed for all encryption units, which are then stored into an IV memory cache (as assumed in FIG. 2); and (iii) for each unit: (a) perform a fast lookup of the corresponding IV from the IV cache; (b) instantiate cipher (as assumed, though not explicitly shown in FIG. 1); and (c) encrypt this unit (as shown in FIG. 1).

For instance, the system 100 depicted in FIG. 1 schematically represents a computerized unit 101, e.g., a general-purpose computer, which may be configured to implement aspects of this invention. In exemplary embodiments, in terms of hardware architecture and as shown in FIG. 1: the unit 101 includes a processor 105, memory 110 coupled to a memory controller 115, and one or more input and/or output (I/O) devices 140, 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. This memory may for instance be loaded with computer-readable program code such as described above, i.e., for implementing operations of the present methods. Such code may notably exhibit two functionally distinct modules: one for generating IVs and another one for performing the encryption and/or decryption operations discussed above, which modules are suitably coupled to enable embodiments of this invention. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105. The memory may notably include a memory cache, closer to the processor 105, to store and quickly recall the generated IVs, as discussed in the previous section.

The software in memory 110 may include one or more separate programs, each of which comprises an ordered listing of executable instructions for implementing logical functions. In the example of FIG. 1, the software in the memory 110 may include methods described herein in accordance with exemplary embodiments, as well as a suitable operating system (OS) 111. The OS 111 essentially controls the execution of other computer programs, such as those implementing methods as described herein (e.g., FIGS. 1-3), and provides scheduling, input-output control, file and data management, memory management, and communication control and related services. Note that in embodiments, the present methods may be executed by the OS itself, or still, by a firmware.

Possibly, a conventional keyboard 150 and mouse 155 can be coupled to the input/output controller 135 (in particular for the BS, if needed). Other I/O devices 140-155 may be provided. In addition, the I/O devices 140-155 may further include devices that communicate both inputs and outputs. The system 100 can further include a display controller 125 coupled to a display 130. In exemplary embodiments, the system 100 can further include a network interface or transceiver 160 for coupling to a network 165. The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The invention claimed is:

1. A computerized system configured for encrypting a plurality of units, wherein each of the plurality of units comprises respective data, the system comprising:
    an initialization vectors generating component for generating a first initialization vector (IV) corresponding to a first unit of the plurality of units and a second IV corresponding to a second unit of the plurality of units, wherein generating the first IV and the second IV comprises:
        performing a single instantiation of an IV-generating cipher; and generating the first IV simultaneously with the second IV using the single instantiation of the IV-generating cipher;

a memory coupled to the initialization vectors generating component, wherein the memory is configured to store the first IV and the second IV; and an encryption component coupled to the memory, wherein the encryption component is configured to access the stored first IV corresponding to the first unit and encrypt the first unit according to the accessed first IV and an encryption key, wherein the memory is further configured to store the encrypted first unit.

2. The computerized system of claim 1, wherein the memory is a cache memory.

3. The computerized system of claim 1, wherein the first IV is distinct from the second IV.

4. The computerized system of claim 1, wherein the initialization vectors generating component is further configured to:

check whether a third IV corresponding to a third unit of the plurality of units is already available prior initiating generation of the third IV;

determine that the third IV is accessible from storage; and skip generation of the third IV.

5. The computerized system of claim 1, wherein generating the first IV comprises generating the first IV based at least in part on a tweak that comprises a unit identifier that uniquely identifies the first unit, and wherein accessing the stored first IV is performed based at least in part on the tweak.

6. The computerized system of claim 1, further comprising a decryption component configured to:

access the encrypted first unit and the stored first IV; and decrypt the encrypted first unit according to the stored first IV and the encryption key that was used to encrypt the first unit.

7. The computerized system of claim 6, wherein at least one of encrypting the first unit or decrypting the first unit uses one of an xor-encrypt-xor (XEX) or an XEX-based tweaked-codebook mode with ciphertext stealing (XTS) encryption mode with a block cipher.

8. The computerized system of claim 6, wherein the initialization vectors generating component is further configured to:

generate a set of IVs, each IV corresponding to a respective unit of the plurality of units, the set of IVs including the first IV and the second IV;

store the set of IVs, wherein each IV is stored in association with the corresponding respective unit; and prior to any of the set of stored IVs being accessed, re-generate at least one IV and storing the re-generated IV in association with the corresponding respective unit.

9. The computerized system of claim 1, wherein at least one of the first IV or the second IV is generated by electronic codebook encryption.

10. The computerized system of claim 1, wherein generating the first IV comprises combining a unit offset, indicating an offset of the first unit, and a randomly generated value.

11. The computerized system of claim 1, further comprising generating a set of IVs, each IV corresponding to a respective unit of the plurality of units, the set of IVs including the first IV and the second IV, wherein generating the set of IVs is decoupled from encrypting any respective unit corresponding to any IV in the set of IVs.

* * * * *